Patented Nov. 25, 1924.

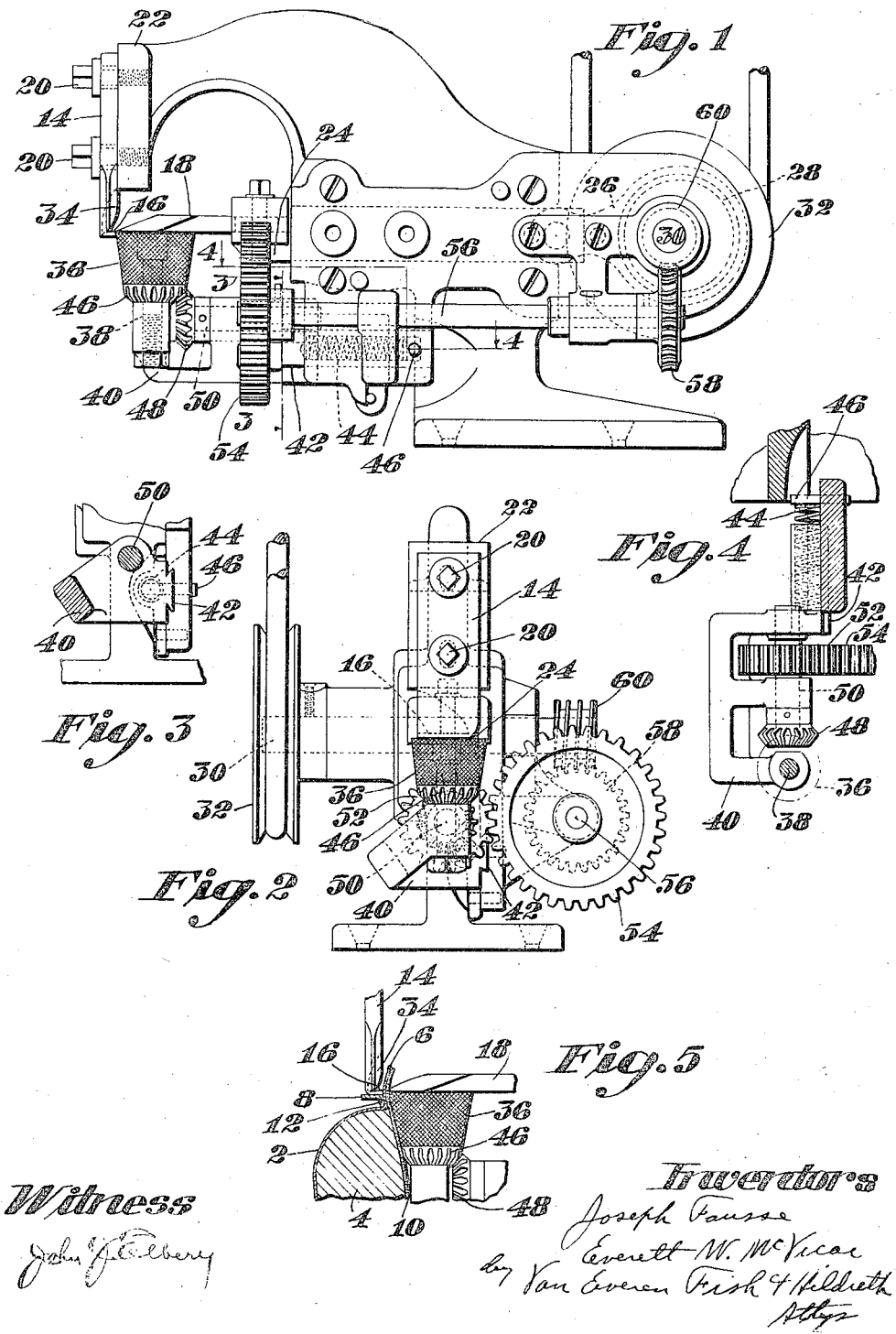

1,516,523

UNITED STATES PATENT OFFICE.

JOSEPH FAUSSE, OF BROCKTON, AND EVERETT W. McVICAR, OF MARLBORO, MASSACHUSETTS, ASSIGNORS TO UNITED SHOE MACHINERY CORPORATION, OF PATERSON, NEW JERSEY, A CORPORATION OF NEW JERSEY.

TRIMMING MACHINE.

Application filed July 13, 1920. Serial No. 395,943.

*To all whom it may concern:*

Be it known that we, JOSEPH FAUSSE and EVERETT W. McVICAR, citizens of the United States, residing, respectively, at Brockton, in the county of Plymouth, and Marlboro, in the county of Middlesex, State of Massachusetts, have invented certain new and useful Improvements in Trimming Machines; and we do hereby declare the following to be a full, clear, and exact description of the invention, such as will enable others skilled in the art to which it appertains to make and use the same.

The present invention relates to trimming machines and more particularly to edge trimming machines which are employed in the manufacture of stitch-down shoes.

Stitch-down shoes of one type have an upper of canvas which is shaped on a last and provided with an outturned flange to which a relatively stiff and thin insole of rubberized canvas is secured by means of a row of staples inserted adjacent the line of junction of the outturned flange with the lasted portion of the upper. A rubber welt is laid upon the outturned flange of the upper and is sewed at its inner edge to the flange and the insole, which welt is of sufficient width to enable it to be brought down over the edges of the outturned flange and insole and vulcanized or otherwise secured to a rubber sole placed over the insole. In order that the welt may be laid properly over the edges of the outturned flange and insole, these edges are trimmed uniformly about the lasted portion of the upper before the welt and outsole are secured together.

One of the objects of the present invention is to provide a machine which is particularly adapted for trimming the edges of the outturned flange and the insole after the welt has been attached to the outturned flange.

With this object in view, a feature of the present invention consists in a machine having means for trimming the upper and sole of a stitch-down shoe after the welt has been attached at its inner edge to the outturned flange of the upper, and means for deflecting the welt away from the field of the trimming cut. Except as defined in the claims, however, certain features of the present invention are not limited to a machine for operating upon an article of this type.

Other features of the present invention consist in certain constructions, arrangements and combinations of parts hereinafter described and claimed, the advantages of which will be obvious to those skilled in the art.

The several features of the present invention will be clearly understood from the following description and accompanying drawings in which:

Figure 1 is a side elevation of a machine embodying the features in their preferred form; Fig. 2 is a front elevation of the machine; Fig. 3 is a detail sectional view taken on the line 3—3 of Fig. 1; Fig. 4 is a detail sectional view taken on the line 4—4 of Fig. 1; and Fig. 5 is a detail side elevation of parts of the operating instrumentalities of the machine shown as operating upon a partially constructed stitch-down shoe.

In Fig. 5 a portion of a stitch-down shoe is illustrated as having an upper 2 of canvas which is shaped to a last 4 so that its marginal portion forms an outturned flange 6 to which a welt 8 of rubber and an insole 10 of rubberized canvas are fastened by means of a row of stitches 12 adjacent to the crease or the line of junction of the lasted portion of the upper and the outturned flange. The machine illustrated in the drawings is adapted to trim the outturned flange and the insole close to the row of stitches. This machine is provided with a stationary trimming knife 14 having a horizontal cutting edge 16, and a horizontally reciprocating trimming knife 18, the cutting edge of which works across the cutting edge of the stationary knife 14. The shank of the stationary knife 14 is secured by bolts 20 to an overhanging portion 22 of the frame of the machine. The reciprocating knife 18 is mounted on the forward end of a sliding bar 24 mounted in the frame. The sliding bar 24 is reciprocated by a link 26 having one end pivotally connected with the rear end of the bar and having an eccentric strap formed on its other end that engages an eccentric 28 carried by the driving shaft 30 of the machine. The shaft 30 is journaled in a bearing in the frame and is driven through a pulley 32 secured to one end thereof.

The stationary knife 14 projects downwardly below its cutting edge and its end is flattened to engage the inner face of the welt to act as a distance gage to determine the height of the trimming cut. The knife 14 is provided with a plow-shaped surface 34 which acts to turn back the welt out of the path of the reciprocating knife as the work is fed between the knives.

The illustrated machine is also provided with a driven feed roll 36 that yieldingly engages the outer face of the insole and cooperates with the inner side of the lower end of the stationary knife to grip and feed the work. The feed roll is provided with a frusto-conical work engaging surface which is knurled and the roll is arranged so that the reciprocating knife works across its larger end. With this construction it will be apparent that as the work is fed between the trimming knives, the margins of the outturned flange and insole will be firmly pressed together by the feed roll and lower end of the stationary knife adjacent to the point where the knives cut the work, which results in a uniform and clean trimming cut being made. It will also be apparent that the frusto-conical surface of the feed roll has a greater amplitude of feeding motion at its upper end than elsewhere, while the inclination thereof favors close trimming of the sole and upper and easy bending of the welt.

The feed roll 36 is loosely mounted on the upper portion of a stud or bolt 38 secured in a boss projecting from a carrier 40. The carrier 40 is mounted to slide horizontally on the machine frame through a sliding dove-tailed connection 42 with the frame and is urged forwardly to press the feed roll against the work by means of a coiled spring 44 interposed between the rear end of the carrier and a pin 46 secured to the frame. The mechanism for driving the feed roll comprises a beveled gear 46 formed on the lower end thereof which is engaged by a beveled gear 48 secured to the forward end of a shaft 50 journaled in bearings on the carrier 40. A spur gear 52 is secured to the shaft 50 and is operatively engaged by a gear 54 carried on the forward end of a shaft 56 journaled in bearings in the frame, the spur gear connection between the shafts 50 and 56 permitting longitudinal movement of the carrier 40 independently of the shaft 56. The shaft 56 is driven by a spiral gear 58 secured on its rear end which engages a worm 60 carried by the driving shaft 30.

The nature and scope of the present invention having been indicated and a machine embodying the several features of the invention in their preferred form having been specifically described, what is claimed is:—

1. A machine of the character described comprising trimming mechanism including cooperative shearing members, and work-feeding mechanism including a driven roll arranged to engage the work, one of said shearing members being arranged to cooperate with said roll to maintain a continuous grip on the work.

2. A machine of the character described comprising a chopping knife arranged to trim surplus material from the margin of the sole and from the out-turned margin of the upper of a stitchdown shoe, a member arranged to bend the welt from the field of trimming, and a work-feeding member arranged to act on the face of the sole, one of said members being arranged also to brace the work against the cutting stress of said knife.

3. A machine for operating upon the upper and sole of a stitch-down shoe after a welt has been attached at its inner edge to the outturned flange of the upper having means comprising a trimming knife having a plow shaped end for trimming the edges of the outturned flange and sole and for deflecting the welt out of the field of the trimming cut.

4. A machine for operating upon the upper and sole of a stitch-down shoe after a welt has been attached at its inner edge to the outturned flange of the upper having, in combination, means comprising a reciprocating trimming knife for trimming the edges of the outturned flange and sole, and means for deflecting the welt out of the path of the knife.

5. A machine for operating upon the upper and sole of a stitch-down shoe after a welt has been attached at its inner edge to the outturned flange of the upper having, in combination, means for trimming the edges of the outturned flange and sole, and means for pressing the sole and outturned flange together and for guiding the work past the trimming means, said pressing and guiding means being formed and arranged to deflect the welt out of the field of the trimming cut.

6. A machine of the character described comprising a fixed member and a rotary work-feeding member between which the out-turned margin of the upper and the margin of the sole are firmly held, and a movable cutter arranged to trim surplus material from said margins of the upper and sole, said fixed member being formed and arranged to determine the course of trimming by bearing on and bending the welt adjacent to its line of anchorage to the shoe.

7. A machine of the character described comprising two cooperative work-guiding members between which the out-turned margin of the upper and the margin of the sole are firmly held, and a movable cutter arranged to trim surplus material from said margins of the upper and sole, one of said work-guiding members being formed and arranged to brace the work against the cutting stress of said cutter, and the other being formed and operated to feed the work.

8. A trimming machine having, in combination, means for trimming the edge of a piece of material comprising a stationary work-engaging member, a chopping knife arranged to cooperate with said member, a feed roll cooperating with said member to clamp and to feed the work and having one end substantially in the plane of the trimming cut, and means for rotating the feed roll.

9. A trimming machine having, in combination, a feed roll to engage one side of a piece of material, and means for trimming the edge of the piece of material comprising a stationary knife having a work engaging end to cooperate with the feed roll to feed the work, and a reciprocating knife cooperating with the stationary knife and working across one end of the feed roll.

10. A trimming machine having, in combination, means for feeding a piece of material comprising a spring pressed frusto-conical feed roll to engage one side of the piece of material, and means for trimming the edge of the piece of material comprising a stationary knife having a work engaging end to cooperate with the feed roll to feed the work and a reciprocating knife cooperating with the stationary knife and working across one end of the feed roll.

11. A shoe-trimming machine comprising means arranged to trim the edges of the sole and the outturned margin of the upper of a stitchdown shoe to which a welt is attached by its inner margin, a feed-roll arranged to act on the sole, and a member arranged to cooperate with said feed-roll to clamp said outturned margin and the sole together, said member being formed and arranged also to deflect the welt so that it will clear the field of trimming.

12. A shoe-trimming machine comprising a movable trimming knife and a work-sustaining member arranged to function conjointly to trim the edges of the sole and outturned margin of the upper of a stitchdown shoe to which a welt has been attached by its inner margin, said work-sustaining member being formed and arranged also to deflect the welt so that it will clear the field of trimming.

13. A shoe-trimming machine comprising a driven feed-roll arranged to feed the shoe by engagement with the bottom of the sole, a movable trimming knife arranged to work in contiguous relation to one end of said roll, and a fixed work-sustaining member arranged in shearing relation to said knife and in work-clamping relation to said feed-roll.

14. A shoe-trimming machine comprising a feed-roll, a reciprocatory trimming knife arranged to work across one end of said roll, and a gage formed and arranged to bear on a turned back welt attached by its inner margin to a stitchdown shoe, said gage and feed-roll constituting clamping members one of which is spring-stressed to clamp the sole and outturned margin of the upper of such shoe, said knife being arranged to trim said sole and outturned margin.

15. A shoe-trimming machine comprising a frusto-conical feed-roll, a gage arranged to cooperate with the larger end of the periphery of said roll to clamp the material to be trimmed, and a movable trimming knife arranged to work across the material so clamped and also arranged in shearing relation to one of said clamping elements.

16. A shoe-trimming machine comprising a knurled feed-roll, a member arranged to cooperate with one end of the periphery of said roll to clamp the material to be trimmed, and a movable trimming knife arranged to work across the material so clamped and also arranged in shearing relation to said member.

JOSEPH FAUSSE.
EVERETT W. McVICAR.